(12) United States Patent  
Orr

(10) Patent No.: US 11,333,074 B2
(45) Date of Patent: May 17, 2022

(54) LIQUID PROPELLANT ROCKET ENGINE TURBOPUMP DRAIN

(71) Applicant: Aerojet Rocketdyne, Inc., Sacramento, CA (US)

(72) Inventor: Neil H. Orr, Sacramento, CA (US)

(73) Assignee: AEROJET ROCKETDYNE, INC., Sacramento, CA (US)

( * ) Notice: Subject to any disclaimer, the term of this patent is extended or adjusted under 35 U.S.C. 154(b) by 481 days.

(21) Appl. No.: 16/316,703

(22) PCT Filed: Jul. 26, 2017

(86) PCT No.: PCT/US2017/043895
§ 371 (c)(1),
(2) Date: Jan. 10, 2019

(87) PCT Pub. No.: WO2018/022723
PCT Pub. Date: Feb. 1, 2018

(65) Prior Publication Data
US 2019/0153955 A1   May 23, 2019

Related U.S. Application Data

(60) Provisional application No. 62/368,480, filed on Jul. 29, 2016.

(51) Int. Cl.
*F02K 9/54* (2006.01)
*F02C 7/232* (2006.01)
(Continued)

(52) U.S. Cl.
CPC ............ *F02C 7/232* (2013.01); *F01D 25/32* (2013.01); *F02C 7/222* (2013.01); *F02K 9/48* (2013.01);
(Continued)

(58) Field of Classification Search
CPC ........ F02K 9/48; F02K 9/54; F05D 2260/602; F05D 2260/6022
See application file for complete search history.

(56) References Cited

U.S. PATENT DOCUMENTS 3,355,888 A    12/1967  Gordon
3,402,671 A *  9/1968  Studebaker ............ F16J 15/008
                                                          415/24
(Continued)

FOREIGN PATENT DOCUMENTS

RU          2562323          9/2015

OTHER PUBLICATIONS

"Drainage and Sewer Pipe Slope" [https://www.archtoolbox.com/materials-systems/plumbing/pipe-slope.html accessed on Jun. 7, 2021] (Year: 2021).*

(Continued)

*Primary Examiner* — Lorne E Meade
(74) *Attorney, Agent, or Firm* — Carlson, Gaskey & Olds, P.C.

(57) ABSTRACT

A liquid propellant rocket engine includes a pump that is disposed along a central axis. The pump includes a purge system, a collection annulus in fluid communication with the purge system, and a drain. The collection annulus has an outer diameter wall, an inner diameter wall, and an end wall. The end wall defines an annular channel that has a channel depth that varies circumferentially. The drain opens to the collection annulus. At the drain, the annular channel has a lowest point at which the channel depth is maximum depth.

16 Claims, 3 Drawing Sheets

(51) Int. Cl.
*F02K 9/48* (2006.01)
*F01D 25/32* (2006.01)
*F02C 7/22* (2006.01)

(52) U.S. Cl.
CPC .......... *F02K 9/54* (2013.01); *F05D 2250/292* (2013.01); *F05D 2250/294* (2013.01); *F05D 2250/314* (2013.01); *F05D 2260/6022* (2013.01)

(56) References Cited

U.S. PATENT DOCUMENTS

| | | | | |
|---|---|---|---|---|
| 3,680,976 | A * | 8/1972 | Buse | F04D 29/426 415/110 |
| 4,644,207 | A * | 2/1987 | Catterfeld | F04D 13/0666 310/114 |
| 5,927,653 | A * | 7/1999 | Mueller | B64G 1/62 244/171.3 |
| 6,976,679 | B2 * | 12/2005 | Goss | F01D 11/122 277/347 |
| 7,938,906 | B2 * | 5/2011 | Wen | H01L 21/67086 118/719 |
| 8,864,441 | B1 * | 10/2014 | Pinera | F04D 1/06 415/105 |
| 2001/0015063 | A1 | 8/2001 | Maeding | |
| 2004/0253747 | A1 * | 12/2004 | Wen | H01L 21/67086 438/14 |

OTHER PUBLICATIONS

Space Exploration Technologies Corporation—Falcon 9 web-page [https://web.archive.Org/web/20130715094112/http://www.spacex.com/falcon9#merlin_engine archived Jul. 15, 2013] (Year: 2013).*
International Preliminary Report on Patentability for International Application No. PCT/US2017/043895 dated Feb. 7, 2019.
International Search Report for International Patent Application No. PCT/US2017/043895 completed Jan. 11, 2018.

* cited by examiner

LIQUID PROPELLANT ROCKET ENGINE TURBOPUMP DRAIN

CROSS-REFERENCE TO RELATED APPLICATION

The present disclosure claims priority to U.S. Provisional Patent Application No. 62/368,480, filed Jul. 29, 2016.

STATEMENT REGARDING FEDERALLY SPONSORED RESEARCH OR DEVELOPMENT

This invention was made with government support under contract number FA8811-16-9-0003 awarded by the United States Air Force. The government has certain rights in the invention.

BACKGROUND

Turbopumps for liquid propellant rocket engines may have a fuel pump side and an oxidizer pump side. A purge system is used between the pump sides as a seal. The purge system utilizes a high pressure vapor as a barrier to leakage. The high pressure vapor may flush fuel that escapes from the fuel pump side into a collection region in the turbopump and then through a drain to a fuel return line. Residual fuel may become entrapped in or around the collection region.

Such rocket engines are used in a vertical orientation but may be horizontal during storage or transport. The entrapped residual fuel may be temporarily freed when the engine is tilted from vertical to horizontal. However, in order to ensure draining of the fuel from the collection region when in a horizontal orientation, a high number of drains might be needed around the circumference of the collection region.

SUMMARY

A liquid propellant rocket engine according to an example of the present disclosure includes a pump disposed along a central axis. The pump has a purge system, and a collection annulus in fluid communication with the purge system. The collection annulus has an outer diameter wall, an inner diameter wall, and an axial end wall. The axial end wall has a variable depth channel that varies circumferentially, and a drain that fluidly couples with the collection annulus. The variable depth channel has a maximum depth.

In a further embodiment of any of the foregoing embodiments, the collection annulus is radially outwards of the purge system and axially offset from the purge system.

In a further embodiment of any of the foregoing embodiments, the annular channel has a channel width that varies circumferentially.

In a further embodiment of any of the foregoing embodiments, the channel width has a maximum width at the drain.

A liquid propellant rocket engine according to an example of the present disclosure includes a pump disposed along a central axis. The pump has a purge system, and a collection annulus in fluid communication with the purge system. The collection annulus has an outer diameter wall, an inner diameter wall, and an end wall. The end wall defines an annular channel, and a drain that opens at the end wall of the collection annulus.

In a further embodiment of any of the foregoing embodiments, the drain extends along a central drain axis, and the central drain axis slopes with respect to the central axis of the pump.

In a further embodiment of any of the foregoing embodiments, the drain extends along a central drain axis and has first and second legs, and the central drain axis is parallel to the central axis of the pump in the first leg.

In a further embodiment of any of the foregoing embodiments, the first leg opens at the end wall of the collection annulus. The central drain axis in the second leg slopes with respect to the central axis of the pump, and the second leg opens to the first leg.

In a further embodiment of any of the foregoing embodiments, the annular channel has a channel depth that varies circumferentially and, at the drain, the annular channel has a lowest point at which the channel depth is maximum depth.

A pump according to an example of the present disclosure includes a fuel pump portion, an oxidizer pump portion, a purge system between the fuel pump and the oxidizer pump, and a collection annulus in fluid communication with the purge system. The collection annulus has an outer diameter wall, an inner diameter wall, and an end wall. The end wall defines an annular channel that has a channel depth that varies circumferentially between a maximum depth and a minimum depth, and a ratio of the maximum depth to the minimum depth is at least 2:1, and a drain that opens at the end wall of the collection annulus. annular channel has a lowest point at which the channel depth is maximum depth.

In a further embodiment of any of the foregoing embodiments, the ratio is from 3:1 to 5:1.

In a further embodiment of any of the foregoing embodiments, the drain extends along a central drain axis and has first and second legs, and the central drain axis is parallel to the central axis of the turbopump in the first leg.

In a further embodiment of any of the foregoing embodiments, the first leg opens at the end wall of the collection annulus. The central drain axis in the second leg slopes with respect to the central axis of the turbopump, and the second leg opens to the first leg.

In a further embodiment of any of the foregoing embodiments, the central axis in the second leg slopes radially outwardly and away from the purge system.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
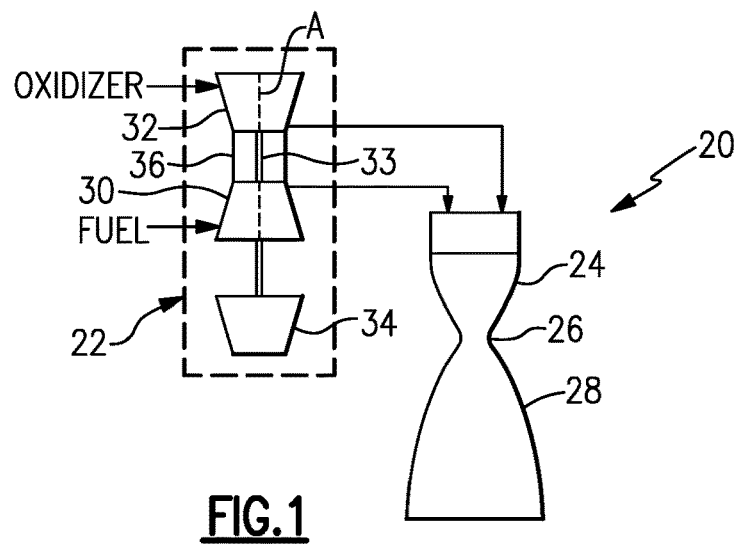
FIG. 1 illustrates an example liquid propellant rocket engine.

FIG. 1 schematically illustrates a liquid propellant rocket engine 20. As will be appreciated, there are many different types of liquid propellant engines to which this disclosure may apply. In this regard, although not shown, the engine 20 will typically have plumbing for conveying propellant(s) and various pumps and valves for controlling propellant delivery. In this example, the engine 20 includes a turbopump 22 that is operable to pump fuel (e.g., liquid hydrogen or hydrocarbon) and oxidizer (e.g., liquid oxygen) to a combustor 24. The fuel and oxidizer burn to generate high pressure gases that are accelerated through a throat 26 and nozzle 28 to generate thrust.

The turbopump 22 includes a fuel pump portion 30 and an oxidizer pump portion 32. In this example, the pump portions 30/32 are mounted on a shaft 33 along a central axis A. The pump sections 30/32 are coupled to a turbine 34, which is operable to drive the pump portions 30/32. The turbopump 22 includes a purge system 36 that is generally located axially between the pump portions 30/32.

Figure 2A:
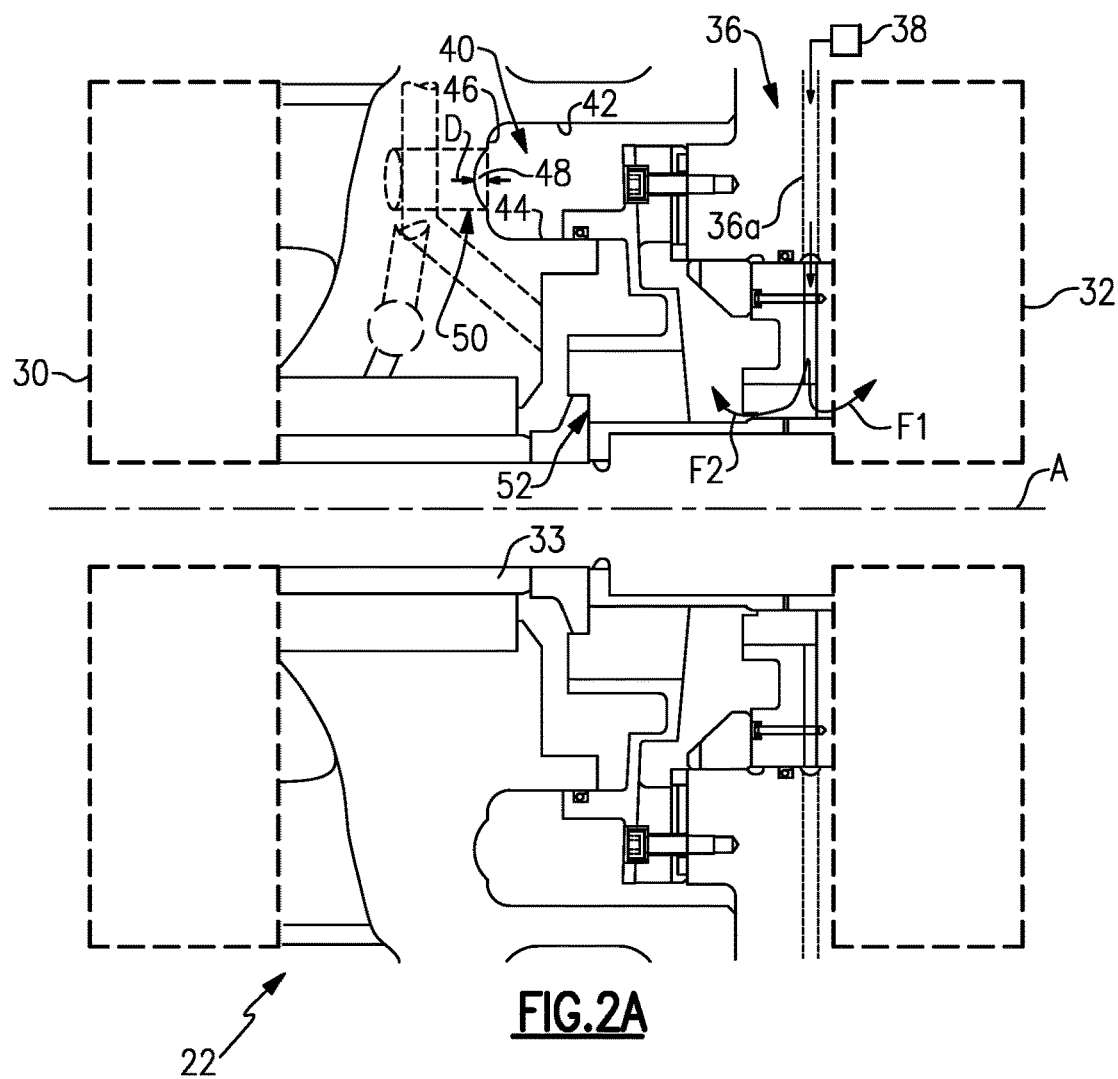
FIG. 2A shows a sectioned view of select portions of a turbopump taken along the central axis.
Figure 2B:
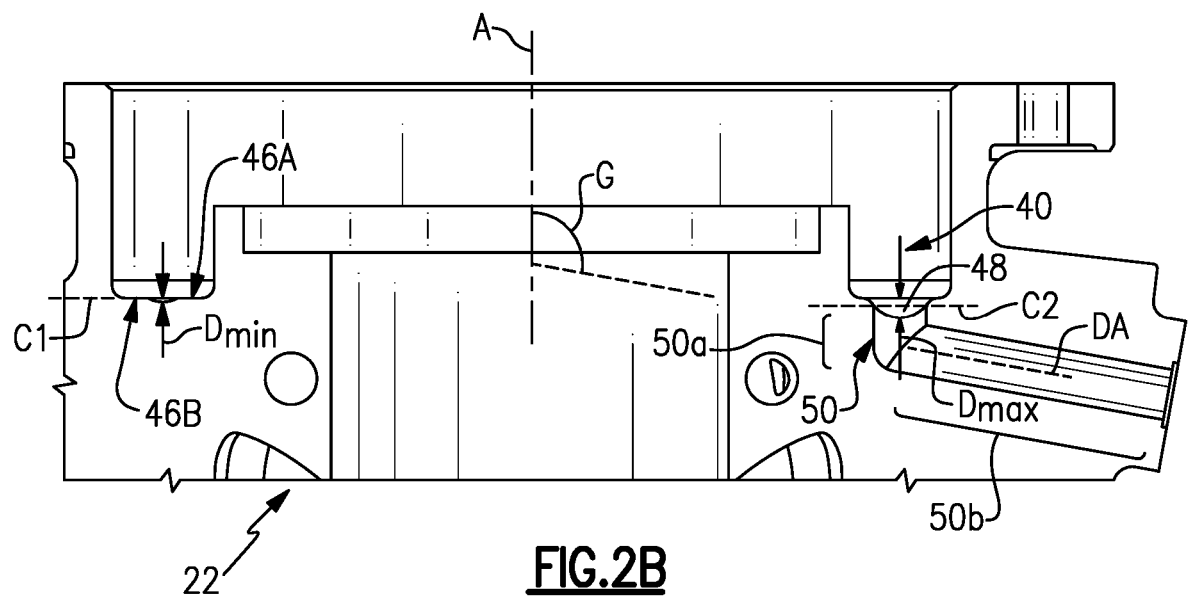
FIG. 2B shows another sectioned view of select portions of the turbopump taken along the central axis.
Figure 2C:
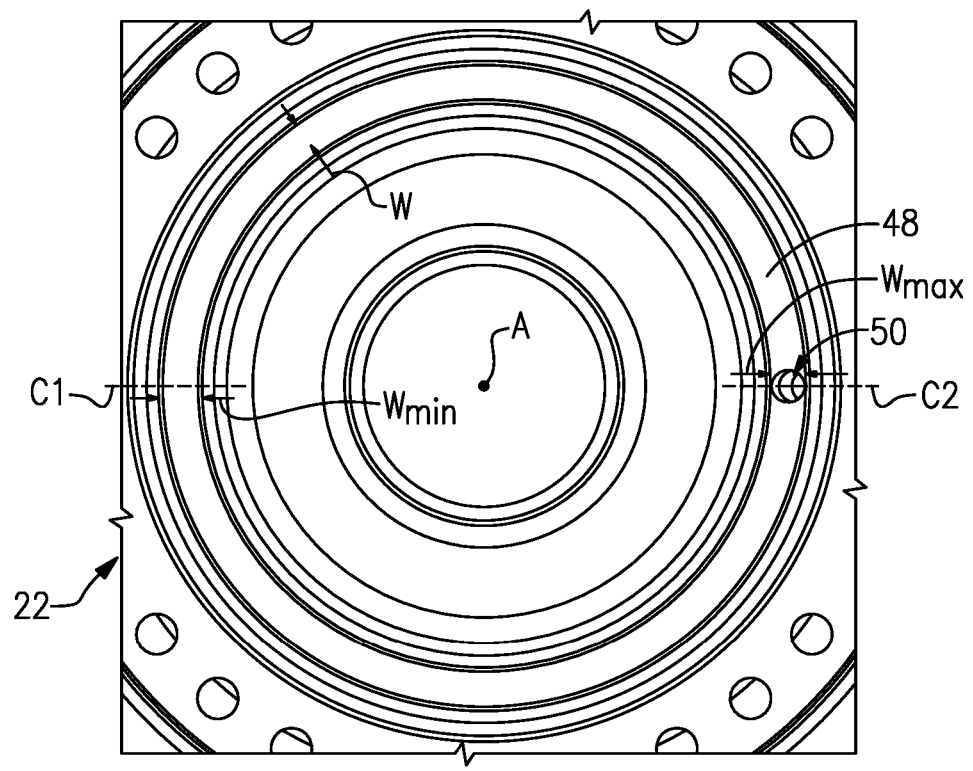
FIG. 2C shows a sectioned axial view of the turbopump.

Referring to FIGS. 2A, 2B, and 2C, the purge system 36 in this example includes one or more channels 36a that are fluidly connected with a pressurized fluid source 38 that may be located outside of the turbopump 22. For example the pressurized fluid source is a source of high pressure helium. The helium is fed into the purge system 36 to facilitate sealing and keeping the fuel separated from the oxidizer. A portion F1 of the helium flows toward the oxidizer pump portion 32 to limit oxidizer flow toward the fuel pump portion 30. Another portion F2 of the helium flows toward the fuel pump portion 30 to limit fuel flow toward the oxidizer pump portion 32.

The turbopump 22 includes a collection annulus 40 in fluid communication with the purge system 36. The collection annulus 40 is generally radially offset from and below the purge system (when the turbopump 22 is in a vertical orientation). Although the collection annulus 40 and related features are disclosed in the turbopump 22, it is to be understood that the examples herein may also be applicable to other types of pumps.

The collection annulus 40 has an outer diameter wall 42, an inner diameter wall 44, and an axial end wall 46. The end wall 46 defines an annular channel 48 between a first axial end wall section 46A extending from the inner diameter wall 44 and a second axial end wall section 46B extending from the outer diameter wall 42. The first axial end wall section 46A extending to an inner diameter edge of the annular channel 48. The second axial end wall section 46B extending to an outer diameter edge of the annular channel 48. A drain 50 opens to the collection annulus 40. In this example, the drain 50 opens at the end wall 46 and, more specifically, at the annular channel 48.

The annular channel 48 is recessed in the end wall 46. The annular channel 48 has a channel depth D that varies circumferentially (about central axis A). For example, the channel depth D is the perpendicular distance from the plane of the end wall 46 to the bottom-most location of the annular channel 48. In this example, the annular channel 48 has a semi-circular cross-sectional geometry; however, it is to be understood that the annular channel 48 may alternatively have other cross-sectional geometries such as, but not limited to, polygonal or elliptical. In general, curved geometries such as semi-circular or elliptical may facilitate fuel flow.

FIGS. 2B and 2C show the variation in the channel depth D. For example, at circumferential location C1 the annular channel 48 has a minimum depth Dmin, and at circumferential location C2 the annular channel 48 has a maximum depth Dmax. Here, the channel depth D varies continuously from the minimum depth Dmin to the maximum depth Dmax. Alternatively, the channel depth D could vary in a step-wise manner, although a smooth continuous variation may facilitate fuel flow. The location C2 corresponds to the location of the drain 50. That is, the annular channel 48 has its lowest point at the drain 50. In this example, the annular channel 48 has a single lowest point (e.g., rather than a uniform depth channel that would have no point that is lowest).

The collection annulus 40, and particularly the annular channel 48 and drain 50, are configured for enhanced drainage of fuel given the expected orientations of the turbopump 22. When the engine 20 is inactive (i.e., not producing thrust), such as during transport or storage of the engine 20, the engine 20 may be in a substantially horizontal position in which the central axis A is approximately parallel to the ground. When the engine 20 is active (i.e. producing thrust in a test stand or during launch), the tubopump 22 is in a substantially vertical orientation. As depicted generally in FIG. 1, in the vertical position the oxidizer pump portion 32 is above the fuel pump portion 30.

Figure 3:
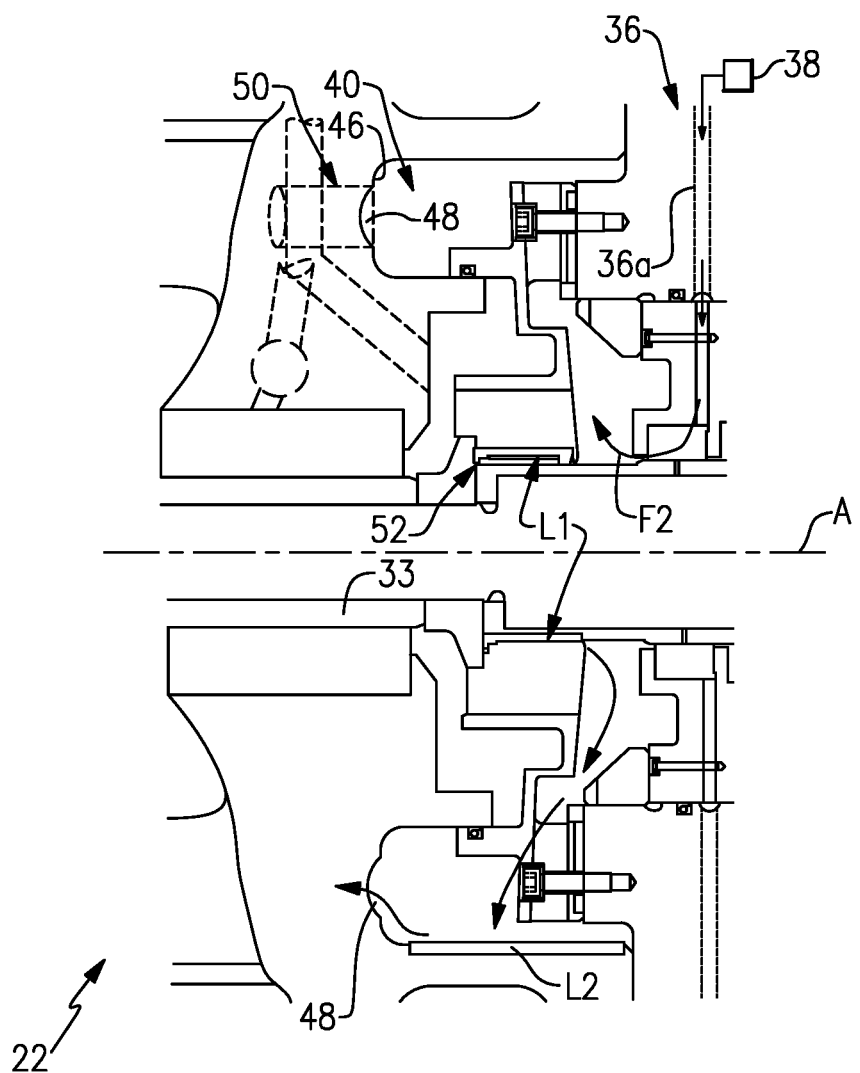
FIG. 3 illustrates drainage of fuel in the turbopump.

Referring to FIG. 3, in the vertical orientation the purge system 36 removes much of the fuel that may escape from the fuel pump portion 30, but residual fuel can become entrapped near a face seal 52 at location L1 (and/or other locations). When in the horizontal orientation, the entrapped residual fuel flows to the gravitational bottom of the collection annulus 40, as shown at location L2. The fuel can remain in the bottom of the collection annulus 40 until the turbopump 22 is tilted to the vertical orientation. Once in the vertical orientation (i.e., FIG. 3 rotated 90 degrees counter-clockwise), the fuel at the bottom of the collection annulus 40 flows to the drain 50 and from the drain 50 to a fuel return line (not shown). Thus, the location of the drain 50 to open at the end wall 46 of the collection annulus 40 permits the entrapped fuel to drain out when tilted from horizontal to vertical rather than flow back to location L1. The drainage of the fuel is thus insensitive to orientation, thereby reducing "loss" of fuel to permanent entrapment.

The channel depth D that varies circumferentially also facilitates draining. When tilted from horizontal to vertical, the fuel falls from location L2 into the annular channel 48. Once in the annular channel 48, the variation in the channel depth causes the fuel to gravitationally flow to the lowest point at the maximum channel depth Dmax, which is also where the drain 50 is located.

The variation in the channel depth D can also be configured to enhance gravitational fuel flow. For example, the maximum depth Dmax and the minimum depth Dmin are circumferentially offset by 180°. This is shown in FIG. 2C, in which location C2 is offset from location C1 by 180°.

As a further example, the change in the channel depth D between the maximum depth Dmax and the minimum depth Dmin is above a threshold. This change can be represented as a ratio of the maximum depth Dmax to the minimum depth Dmin. In one example, the ratio is at least 2:1 to promote good flow. In a further example, for better flow, the ratio is at least 3:1 and may be from 3:1 to 5:1. The ratio may, in some instances, be above 5:1, however, high ratios require a greater amount of design space. Ratios lower than 2:1 may also be used, however, as the ratio approaches 1:1 there is less gravitational potential for flow.

In further examples, the annular channel 48 also defines a channel width, generally depicted at W in FIG. 2C. Similar to the channel depth D, the width may also vary circumferentially to enhance flow of fuel to the drain 50. For instance, at location C1 the annular channel 48 has a minimum width Wmin. At location C2 (at the drain 50) the annular channel 48 has a maximum width Wmax. Like the depth, the width is greatest at the drain 50 to promote flow of the fuel to the drain 50.

In further examples, the drain 50 may also be configured to enhance removal of fuel from the collection annulus 40.

For instance, as shown in FIG. 2B, the drain 50 extends along a central drain axis DA. The central drain axis DA slopes with respect to the central axis A of the turbopump 22, as represented at angle G. Thus, the fuel can also gravitationally flow through the drain 50.

The drain 50 also has several sections or portions. For instance, the drain 50 has first and second legs 50a/50b. The first leg 50a is relatively short and serves as the opening to the end wall 46 of the collection annulus 40. The second leg 50b opens to the first leg 50a. The second leg 50b is relatively long and serves to transport the fuel away from the collection annulus 40. The central drain axis DA is approximately parallel to the central axis A of the turbopump 22 in the first leg, while the central drain axis DA in the second leg slopes radially outwardly and away from the purge system 36.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A liquid propellant rocket engine comprising:
   a pump disposed along a central axis, the pump including
      a purge system,
      a collection annulus in fluid communication with the purge system, the collection annulus having an outer diameter wall, an inner diameter wall, and an axial end wall, the axial end wall having a first axial end wall section extending from the inner diameter wall and a second axial end wall section extending from the outer diameter wall, the first axial end wall section and the second axial end wall section extending to, respectively, an inner diameter edge and an outer diameter edge of a variable depth channel that varies circumferentially, the variable depth channel being axially recessed from the first axial end wall section and the second axial end wall section, and
      a drain that fluidly couples with the variable depth channel at a maximum depth location of the variable depth channel to facilitate gravitational flow of a fluid to and through the drain.

2. The liquid propellant rocket engine as recited in claim 1, wherein the drain extends along a central drain axis, and the central drain axis slopes with respect to the central axis of the pump.

3. The liquid propellant rocket engine as recited in claim 1, wherein the drain extends along a central drain axis and has first and second legs, and the central drain axis is parallel to the central axis of the pump in the first leg.

4. The liquid propellant rocket engine as recited in claim 3, wherein the first leg opens at the maximum depth location of the variable depth channel, the central drain axis in the second leg slopes with respect to the central axis of the pump, and the second leg opens to the first leg.

5. The liquid propellant rocket engine as recited in claim 1, wherein the depth of the variable depth channel is a perpendicular distance from a plane of the axial end wall to a bottom-most location of the variable depth channel.

6. The liquid propellant rocket engine as recited in claim 1, wherein with the pump in a vertical position with respect to the central axis, the variable depth channel is a gravitational bottom of the collection annulus.

7. The liquid propellant rocket engine as recited in claim 1, wherein with the pump in a horizontal position with respect to the central axis the outer diameter wall of the collection annulus is a gravitational bottom to collect fluid, and with the pump in a vertical position with respect to the central axis the variable depth channel becomes the gravitational bottom such that upon tilting of the pump from the horizontal position to the vertical position the fluid at the outer diameter wall of the collection annulus flows into the variable depth channel and then into the drain.

8. The liquid propellant rocket engine as recited in claim 1, wherein the variable depth channel has a minimum depth at a channel location and also a channel width from the inner diameter edge to the outer diameter edge, and the channel width increases along the variable depth channel from the channel location to the drain.

9. The liquid propellant rocket engine as recited in claim 8, wherein the drain extends along a central drain axis and has first and second legs, and the central drain axis in the first leg is parallel to the central axis of the pump.

10. A turbopump comprising:
    a fuel pump portion disposed along a central axis;
    an oxidizer pump portion disposed along the central axis;
    a purge system located between the fuel pump portion and the oxidizer pump portion;
    a collection annulus in fluid communication with the purge system, the collection annulus having an outer diameter wall, an inner diameter wall, and an axial end wall perpendicular to the central axis, the axial end wall having a first axial end wall section extending from the inner diameter wall and a second axial end wall section extending from the outer diameter wall, the first axial end wall section and the second axial end wall section extending to, respectively, an inner diameter edge and an outer diameter edge of a variable depth channel that varies circumferentially, the variable depth channel being axially recessed from the first axial end wall section and the second axial end wall section, the variable depth channel having a channel depth that varies circumferentially between a maximum depth and a minimum depth, and a ratio of the maximum depth to the minimum depth is from 2:1 to 5:1; and
    a drain that opens at the maximum depth location of the variable depth channel to facilitate gravitational flow of a fluid to and through the drain.

11. The pump as recited in claim 10, wherein the ratio is from 3:1 to 5:1.

12. The pump as recited in claim 11, wherein the drain extends along a central drain axis and has first and second legs, and the central drain axis is parallel to the central axis of the turbopump in the first leg.

13. The pump as recited in claim 12, wherein the first leg opens at the maximum depth location of the variable depth channel, the central drain axis in the second leg slopes with respect to the central axis of the turbopump, and the second leg opens to the first leg.

14. The pump as recited in claim 13, wherein the central axis in the second leg slopes radially outwardly and away from the purge system.

15. The pump as recited in claim 10, wherein with the pump in a horizontal position with respect to the central axis the outer diameter wall of the collection annulus is a gravitational bottom to collect fluid, and with the pump in a vertical position with respect to the central axis the variable depth channel becomes the gravitational bottom such that upon tilting of the pump from the horizontal position to the vertical position the fluid at the outer diameter wall of the collection annulus flows into the variable depth channel and then into the drain.

16. The pump as recited in claim 10, wherein the channel depth is a perpendicular distance from a plane of the axial end wall to a bottom-most location of the variable depth channel.

\* \* \* \* \*